United States Patent
Springfield et al.

(10) Patent No.: US 9,280,687 B2
(45) Date of Patent: Mar. 8, 2016

(54) PRE-BOOT AUTHENTICATION USING A CRYPTOGRAPHIC PROCESSOR

(71) Applicant: LENOVO (Singapore) PTE, LTD., New Tech Park (SG)

(72) Inventors: Randall Scott Springfield, Chapel Hill, NC (US); Steven D. Goodman, Raleigh, NC (US); Howard Locker, Cary, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 105 days.

(21) Appl. No.: 13/839,896

(22) Filed: Mar. 15, 2013

(65) Prior Publication Data

US 2014/0281575 A1 Sep. 18, 2014

(51) Int. Cl.
*G06F 21/00* (2013.01)
*G06F 21/72* (2013.01)
*G06F 21/57* (2013.01)
*H04W 12/06* (2009.01)

(52) U.S. Cl.
CPC ............. *G06F 21/72* (2013.01); *G06F 21/575* (2013.01); *H04W 12/06* (2013.01)

(58) Field of Classification Search
CPC ..... G06F 21/575; G06F 21/57; G06F 21/572; G06F 9/4406; H04L 63/0823; H04L 63/10; H04L 63/0428; H04L 9/3247; H04L 9/0825; H04L 9/3263
USPC .......................................................... 713/189
See application file for complete search history.

(56) References Cited

U.S. PATENT DOCUMENTS

| | | | | |
|---|---|---|---|---|
| 5,937,063 A * | 8/1999 | Davis | ............................ | 713/187 |
| 5,960,084 A * | 9/1999 | Angelo | ........................ | 713/185 |
| 6,618,810 B1 * | 9/2003 | Dirie | ................................ | 726/27 |
| 6,633,981 B1 * | 10/2003 | Davis | ............................ | 713/189 |
| 6,829,230 B1 * | 12/2004 | Tiuri | ............................. | 370/351 |
| 2004/0103299 A1 * | 5/2004 | Zimmer et al. | ............... | 713/200 |
| 2006/0129797 A1 * | 6/2006 | Durfee | .................. | G06F 21/575 713/2 |
| 2006/0155988 A1 * | 7/2006 | Hunter et al. | .................. | 713/164 |
| 2006/0167985 A1 * | 7/2006 | Albanese et al. | ............. | 709/203 |
| 2006/0253702 A1 * | 11/2006 | Lowell et al. | ................. | 713/156 |
| 2009/0276620 A1 * | 11/2009 | McCarron et al. | ............ | 713/155 |
| 2010/0082987 A1 * | 4/2010 | Thom et al. | .................... | 713/171 |
| 2012/0180123 A1 * | 7/2012 | Kuenzi | ..................... | G06F 21/34 726/20 |

* cited by examiner

*Primary Examiner* — Syed Zaidi
(74) *Attorney, Agent, or Firm* — Kunzler Law Group, PC

(57) ABSTRACT

An apparatus for cryptographic pre-boot authentication includes a cryptographic processor configured to perform cryptographic operations. The cryptographic processor includes a portion dedicated to the boot interface. The apparatus also includes a storage device storing machine readable code and a processor executing the machine readable code. The machine readable code includes a storage module storing a first cryptographic key on the cryptographic processor. The machine readable code further includes an encryption module encrypting an electronic message with a second cryptographic key. The machine readable code also includes a decryption module decrypting the electronic message with the first cryptographic key where an authorized user is granted access to a device upon successful decryption of the electronic message.

20 Claims, 6 Drawing Sheets

PRE-BOOT AUTHENTICATION USING A CRYPTOGRAPHIC PROCESSOR

BACKGROUND

1. Field

The subject matter disclosed herein relates to pre-boot authentication and more particularly relates to using a cryptographic processor to perform pre-boot authentication.

2. Description of the Related Art

Pre-boot authentication can be an extension of the boot interface and may serve as a trusted authentication layer outside the operating system, essentially creating a tamper-proof environment. Pre-boot authentication may prevent a user from reading anything from a disk drive, such as the operating system, until the user confirms his/her identity by providing the correct credentials, such as a password.

Using passwords, however, may introduce a weakness to the secure environment created by the pre-boot authentication layer because passwords are easily forgotten or misappropriated. An entire system may become compromised when a password is inappropriately placed in the open.

BRIEF SUMMARY

Based on the foregoing discussion, the inventors have recognized a need for an apparatus, method, and program product for performing pre-boot authentication using a cryptographic processor. Beneficially, such an apparatus, method, and program product would provide a more secure computing environment.

An apparatus is provided that includes a cryptographic processor configured to perform cryptographic operations. In one embodiment, the cryptographic processor includes at least a portion dedicated to a boot interface. In another embodiment, the cryptographic processor includes the trusted platform module ("TPM") specification. The apparatus also includes, in one embodiment, a computer readable storage medium storing machine readable code and a processor executing the machine readable code.

In one embodiment, the machine readable code includes a storage module that stores a first cryptographic key on the portion of the cryptographic processor dedicated to the boot interface. In another embodiment, the machine readable code includes an encryption module that encrypts an electronic message with a second cryptographic key. In certain embodiments, the electronic message includes data authorizing access to a device. In a further embodiment, the machine readable code includes a decryption module that decrypts the electronic message with the first cryptographic key, which may be accessible to the boot interface during device pre-boot. In one embodiment, access to the device is granted in response to successfully decrypting the electronic message.

In one embodiment, the storage module provides the boot interface access to the first cryptographic key stored on the portion of the cryptographic processor dedicated to the boot interface during device pre-boot without providing access to other components of the device. In another embodiment, the machine readable code further includes a key generation module that generates the first and second cryptographic keys using a cryptographic algorithm. In one embodiment, the cryptographic algorithm is either a symmetric key or an asymmetric key algorithm. In some embodiments, the first and second cryptographic keys are identical such that the same cryptographic key is used for encrypting and decrypting the electronic message. In one embodiment, the first and second keys are not widely distributed.

In other embodiments, the first and second cryptographic keys are different, where the first cryptographic key may be used to decrypt the electronic message. In one embodiment, the first cryptographic key is not distributed. In another embodiment, the second cryptographic key may be used to encrypt the electronic message and may be distributed to one or more users.

In one embodiment, the machine readable code includes an administration module that creates an electronic message. In another embodiment, the administration module has access to the second cryptographic key and encrypts the electronic message with the second cryptographic key. In other embodiments, the administration module sets the scope of use for the authorized user in the electronic message. In one embodiment, the scope may include the duration of use, the accessible devices, and/or the user's access permissions. In another embodiment, the administration module sets an expiration period for the electronic message such that the validity of the electronic message expires after a predetermined amount of time. The machine readable code, in certain embodiments, may include a distribution module that distributes the encrypted electronic message to an authorized user without distributing the first and second cryptographic keys.

A method is also presented, which, in the disclosed embodiments, substantially includes the steps to carry out the functions presented above with respect to the operation of the describe apparatus. In one embodiment, the method includes storing a first cryptographic key on a portion of a cryptographic processor dedicated to a boot interface of a device. In another embodiment, the method includes encrypting an electronic message with a second cryptographic key. In some embodiments, the electronic message includes data authorizing access to the device. In one embodiment, the method further includes decrypting the electronic message with the first cryptographic key, which may be accessible to the boot interface during device pre-boot. In some embodiments, access to the device is granted upon successfully decrypting the electronic message.

In one embodiment, the first cryptographic key stored on the portion of the cryptographic processor dedicated to the boot interface is accessible to the boot interface during device pre-boot without being accessible to other components of the device. The method, in a further embodiment, includes generating the first and second cryptographic keys using a cryptographic key algorithm. In one embodiment, the cryptographic key algorithm includes a symmetric key algorithm. In another embodiment, the cryptographic key algorithm includes an asymmetric key algorithm.

The method, in another embodiment, includes creating the electronic message, which may be created by an administrator that has access to the second cryptographic key. In one embodiment, the administrator encrypts the electronic message with the second cryptographic key. In a further embodiment, the method includes distributing the encrypted electronic message to an authorized user without distributing the first and second cryptographic keys.

A program product including a storage device storing machine readable code executed by a processor to perform operations is also presented. In one embodiment, the operations include storing a first cryptographic key on the portion of the cryptographic processor dedicated to the boot interface of the device. In another embodiment, the operations include encrypting an electronic message with a second cryptographic key. In some embodiments, the electronic message includes data authorizing access to the device. In one embodiment, the operations further include decrypting the electronic message with the first cryptographic key, which may be accessible to the boot interface during device pre-boot. In some embodiments, access to the device is granted upon successfully decrypting the electronic message.

In one embodiment, the first cryptographic key stored on the portion of the cryptographic processor dedicated to the boot interface is accessible to the boot interface during device pre-boot without being accessible to other components of the device. The operations, in a further embodiment, include generating the first and second cryptographic keys using a cryptographic key algorithm. In one embodiment, the cryptographic key algorithm includes a symmetric key algorithm. In another embodiment, the cryptographic key algorithm includes an asymmetric key algorithm.

The operations, in another embodiment, include creating the electronic message, which may be created by an administrator that has access to the second cryptographic key. In one embodiment, the administrator encrypts the electronic message with the second cryptographic key. In a further embodiment, the operations include distributing the encrypted electronic message to an authorized user without distributing the first and second cryptographic keys.

The embodiments of the present subject matter have been developed in response to the present state of the art, and in particular, in response to the problems and needs in the art that have not yet been fully solved by currently available touch sensors. Accordingly, the embodiments have been developed to provide a method, apparatus, and system for detecting a touch event using a first touch interface and a second touch interface.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
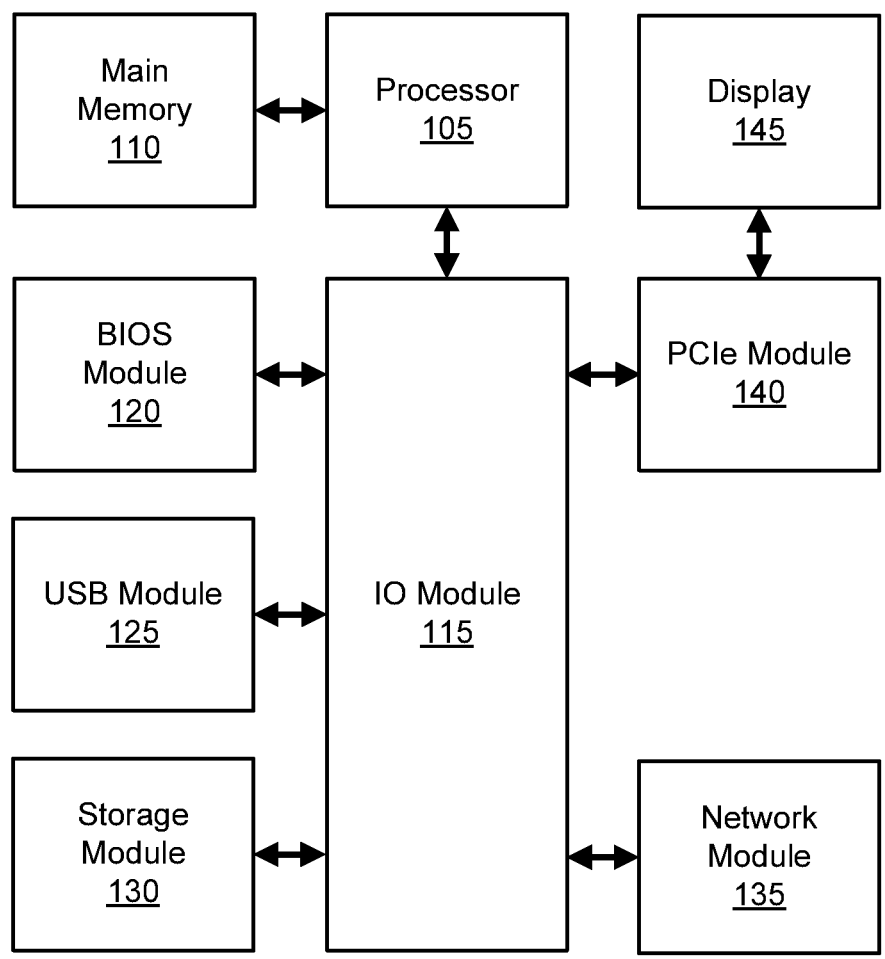
FIG. 1 is a schematic block diagram illustrating one embodiment of an information handling device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network.

Where a module or portions of a module are implemented in software, the software portions are stored on one or more machine readable storage devices.

Any combination of one or more computer readable medium may be utilized. The computer readable medium may be a machine readable signal medium or a machine readable storage medium such as a computer readable storage medium. The machine readable storage medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface ("UEFI"), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2:
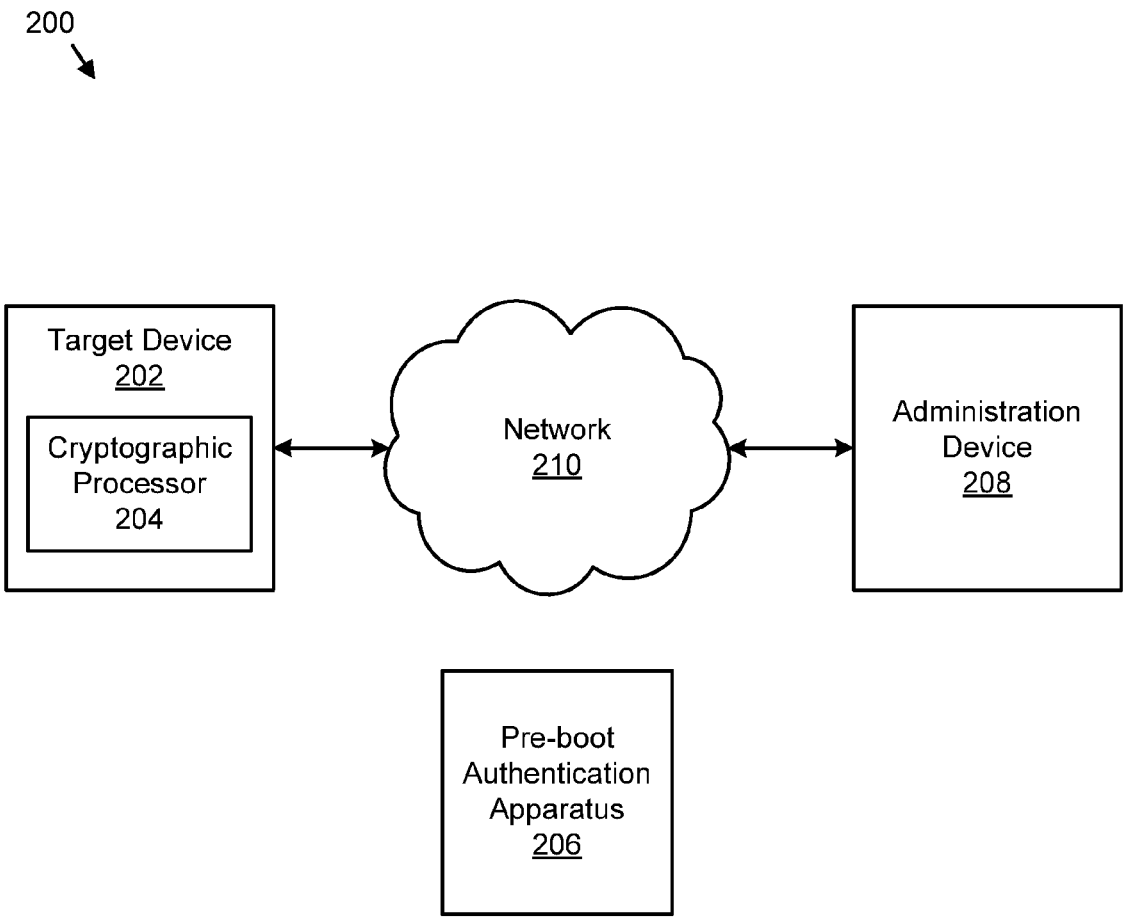
FIG. 2 is a schematic block diagram illustrating one embodiment of a system for pre-boot authentication using a cryptographic processor in accordance with the present subject matter.

FIG. 2 is a schematic block diagram illustrating one embodiment of a system 200 for pre-boot authentication using a cryptographic processor 204. The system 200 includes a target device 202, which includes a cryptographic processor 204, a pre-boot authentication apparatus 206, an administration device 208, and a digital communication network 210. In one embodiment, the pre-boot authentication apparatus 206 decrypts electronic messages encrypted with a cryptographic key. The pre-boot authentication apparatus 206 will be explained in more detail in relation to the apparatus 300 of FIG. 3.

The target device 202, in one embodiment, may be embodied as a computer, a phone, a server, a laptop computer, a tablet computer, a mainframe computer, a blade center, or any other electronic device implementing a cryptographic processor 204 capable of decrypting electronic messages encrypted with a cryptographic key. The administration device 208 may similarly be embodied as a computer, a phone, a laptop computer, a tablet computer, a mainframe computer, a blade center, or the like. In one embodiment, the pre-boot apparatus 206 may include elements on both the target device 202 and the administration device 208. In one embodiment, a user interacts with the target device 202 and/or the administration device 208 using an input device, such as a mouse, keyboard, touch interface, and/or the like.

In one embodiment, the cryptographic processor 204 is a dedicated computer on a chip, a microprocessor, or the like, that is configured to perform cryptographic operations. For example, a cryptographic processor 204 may process encrypted program instructions by decrypting the instructions and executing them in an isolated environment such that the decrypted instructions are not accessed outside the cryptographic processor 204. In another embodiment, the cryptographic processor 204 incorporates one or more physical security measures that provide a tamper proof environment. For example, a cryptographic processor 204 may encrypt data and/or restrict access to data stored on the cryptographic processor 204, making the data inaccessible to other components located on the target device 202.

In another embodiment, the cryptographic processor 204 includes at least a portion that is dedicated to the boot interface. For example, the cryptographic processor 204 may restrict access to a portion of its data store to the boot interface for performing pre-boot authentication. The boot interface may include various firmware interfaces for booting a device, such as a basic input/output system ("BIOS"), unified extensible firmware interface ("UEFI"), Open Firmware, and others. In one embodiment, the portion of the cryptographic processor 204 dedicated to the boot interface stores a cryptographic key that is accessible to the boot interface during target device 202 pre-boot without being accessible to other components of the target device 202. In certain embodiments, the cryptographic processor 204 may implement a trusted platform module ("TPM"), which provides a trusted computing environment on a target device 202 by enabling certain security features, such as secure generation of cryptographic keys, encryption/decryption mechanisms, restricted access to data, and/or the like. For example, a TPM implementation of a cryptographic processor 204 may provide encryption for a portion or an entirety of a computer readable storage medium. In some embodiments, the TPM enabled cryptographic processor 204 encrypts the data processed by the cryptographic processor 204. In other embodiments, the TPM specification provides hierarchies, or multiple usage models, i.e., a portion dedicated to the boot interface, a portion dedicated to a user, a portion dedicated to storage, and/or the like. In such a setup, the boot interface may take advantage of the security and/or cryptographic features of the TPM enabled cryptographic processor 204 to perform hardware level security protection.

The system 200 includes, in one embodiment, a digital communication network 210 that transmits digital communications related to a regulation game. The digital communication network 210 may include a wireless network, such as a wireless telephone network, a local wireless network, such as a Wi-Fi network, a Bluetooth® network, and the like. The digital communication network 210 may include a wide area network ("WAN"), a storage area network ("SAN"), a local area network ("LAN"), an optical fiber network, the internet, or other digital communication network known in the art. The digital communication network 210 may include two or more networks. The digital communication network 210 includes one or more servers, routers, switches, and other networking equipment. The digital communication network 210 may also include computer readable storage media, such as a hard disk drive, an optical drive, non-volatile memory, random access memory ("RAM"), or the like.

Figure 3:
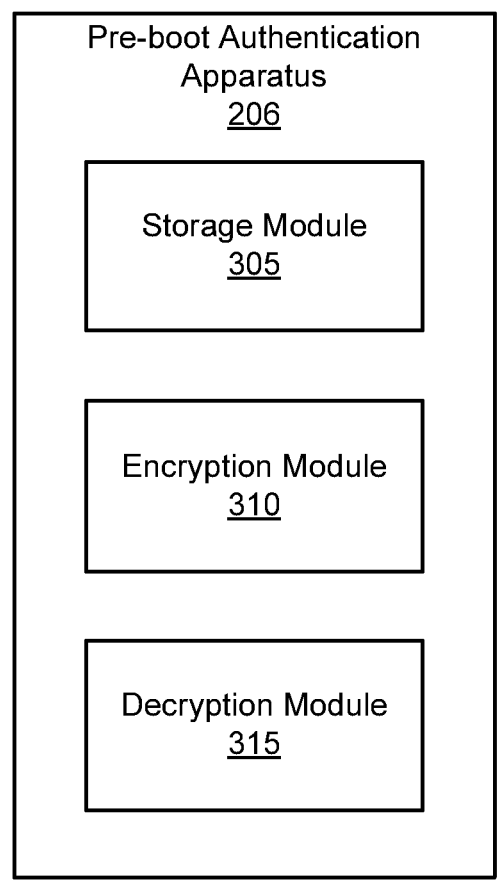
FIG. 3 is a schematic block diagram illustrating one embodiment of an apparatus for pre-boot authentication using a cryptographic processor in accordance with the present subject matter.

FIG. 3 is a schematic block diagram illustrating one embodiment of an apparatus 300 for pre-boot authentication using a cryptographic processor 204 that includes a pre-boot authentication apparatus 206. The pre-boot authentication apparatus 206, in certain embodiments, may include a storage module 305, an encryption module 310, and a decryption module 315, which are described below.

The apparatus 300, in one embodiment, includes a storage module 305 that stores a first cryptographic key on the portion of the cryptographic processor 204 dedicated to the boot interface. As discussed above, the storage module 305, in some embodiments, makes the first cryptographic key accessible to the boot interface during target device 202 pre-boot without making the first cryptographic key accessible to other components of the target device 202. The cryptographic processor 204, in some embodiments, may encrypt the first cryptographic key in order to provide an extra level of security. In another embodiment, the cryptographic processor 204 decrypts the encrypted first cryptographic key.

In certain embodiments, the storage module 305 stores the first cryptographic key on the cryptographic processor 204 during the provisioning process. For example, the storage module 305 may store the first cryptographic key on a USB key, which would be mounted during provisioning, and transfer the first cryptographic key from the USB key to the portion of the cryptographic processor 204 dedicated to the boot interface. In other embodiments, the storage module 305 stores the first cryptographic key on the cryptographic processor 204 sometime after provisioning by an information technology ("IT") administrator or the like. Advantageously, the storage module 305 stores the first cryptographic key on the cryptographic processor 204 in an isolated environment to assure the first cryptographic key does not get out in the open, which may compromise the integrity of the system.

The apparatus 300, in another embodiment, includes an encryption module 310 that encrypts an electronic message with a second cryptographic key. In one embodiment, the first and second cryptographic keys comprise a cryptographic key pair and may be used together to encrypt and decrypt data. In another embodiment, the first and second cryptographic keys are generated by a key generation module 405, which is discussed below with reference to FIG. 4. In one embodiment, the encryption module 310 encrypts the electronic message with a public cryptographic key. As used herein, a public cryptographic key is a cryptographic key that is known to anyone; however, anything encrypted with the public cryptographic key may only be decrypted with an associated private cryptographic key in order to maintain the integrity of the encrypted data. The private key, which in one embodiment would be the first cryptographic key, may be known to very few users and may be used to verify the identity behind the public key. In another embodiment, the encryption module 310 uses a private cryptographic key to encrypt the electronic message. In some embodiments, the second cryptographic key may be the same cryptographic key as the first cryptographic key. The electronic message, in some embodiments, may be decrypted by the cryptographic processor 204 using the first cryptographic key during target device 202 pre-boot. In one embodiment, the encryption module 310 is located on the administration device 208.

In a further embodiment, the electronic message includes data that authorizes access to the target device 202. The electronic message, for example, may contain data regarding the scope of the user's authorization, including the duration of the authorized use, one or more target devices 202 the user is authorized to operate, the permissions of the user on those devices, and/or the like. In one embodiment, the electronic message is a digital certificate, which the encryption module 310 digitally signs using the second cryptographic key. The first cryptographic key, in some embodiments, would then be necessary to decrypt the digital certificate to verify the second public key belongs to an authorized individual. In one embodiment, the encryption module 310 may sign a digital certificate issued by a certificate authority, which certifies the validity of the second cryptographic key. In another embodiment, the encryption module 310 may implement a "web of trust," scheme which uses self-signed digital certificate to evidence the authenticity of the information. In other embodiments, the electronic message may comprise a token, a script, and/or the like. One of skill in the art will recognize other types of electronic messages that may be encrypted with a cryptographic key.

In one embodiment, the apparatus 300 includes a decryption module 315 that decrypts an encrypted electronic message with the first cryptographic key. In some embodiments, the decryption module 315 is located on the target device 202. In one embodiment, the first cryptographic key may be accessible to the boot interface during target device 202 pre-boot, which the decryption module 315 may use to validate the authenticity of an encrypted electronic message. The electronic message, in one embodiment, may be encrypted with the second cryptographic key. In one embodiment, access to the target device 202 is granted in response to the decryption module 315 successfully decrypting the electronic message. For example, during target device 202 pre-boot, the decryption module 315 may access the first cryptographic key, through the boot interface, to decrypt the encrypted electronic message. The user providing the encrypted electronic message may be authorized to use the target device 202 in response to the decryption module 315 successfully decrypting the electronic message.

Advantageously, the use of first and second cryptographic keys obviates the use of passwords and/or other security measures that may be easily compromised, to validate a user authorized to use the target device 202 during target device 202 pre-boot. In this manner, a person granted permission to use a target device 202 does not need to know the value of the first and/or second cryptographic keys, unlike a security system utilizing passwords. The encryption module 310 encrypts an electronic message with the second cryptographic key and the decryption module 315 decrypts the encrypted message using the first cryptographic key during target device 202 pre-boot. The user is granted access if the electronic message is successfully decrypted, meaning the second cryptographic key was a valid match for the first cryptographic key. Additionally, an administrator may include extra data in the electronic message to restrict the authorized user's scope of use of a target device 202, which will be discussed below with reference to FIG. 4.

Figure 4:
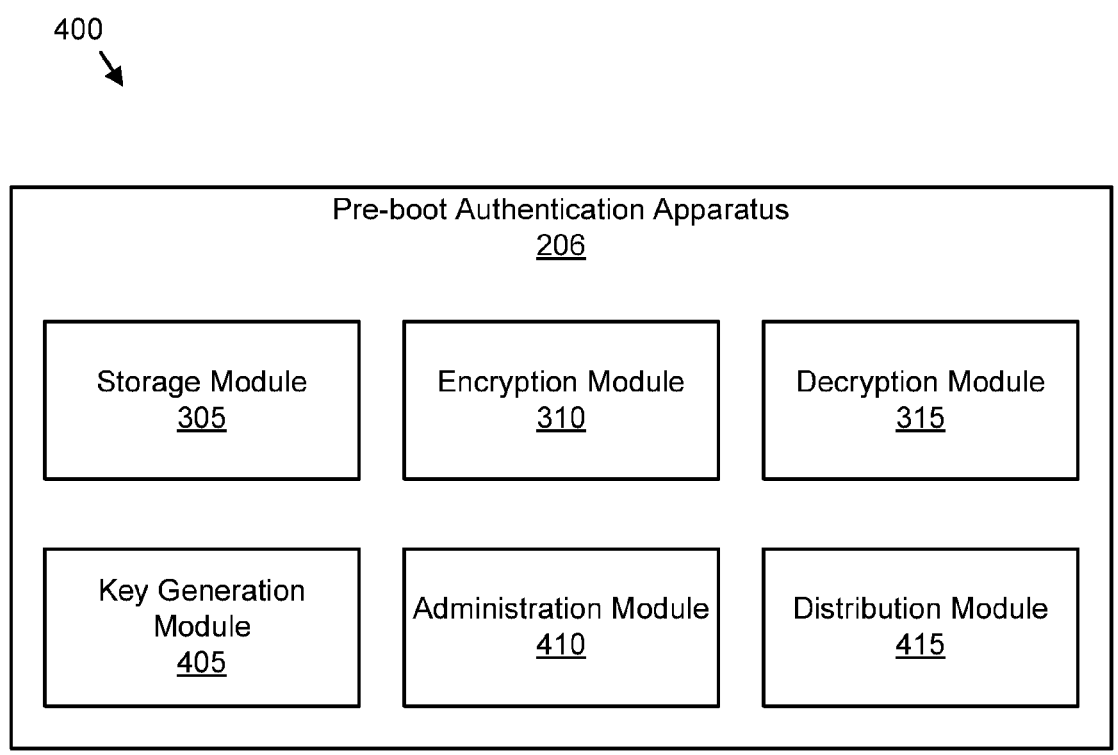
FIG. 4 is a schematic block diagram illustrating another embodiment of an apparatus for pre-boot authentication using a cryptographic processor in accordance with the present subject matter.

FIG. 4 is a schematic block diagram illustrating another embodiment of an apparatus 400 for pre-boot authentication using a cryptographic processor 204. The apparatus 400 may include another embodiment of a pre-boot authentication apparatus 206. The pre-boot authentication apparatus 206, in certain embodiments, may include a storage module 305, an encryption module 310, and a decryption module 315, which are substantially similar to those described in relation to the apparatus 300 of FIG. 3. In various embodiments, the pre-boot authentication module 206 of the apparatus 400 may include a key generation module 405, an administration module 410, and a distribution module 415, which are described below.

The apparatus 400, in one embodiment, includes a key generation module 405 that generates the first and second cryptographic keys using a cryptographic key algorithm. In one embodiment, the cryptographic key algorithm includes a symmetric key algorithm where the cryptographic key used to encrypt data is the same cryptographic key used to decrypt the encrypted data. For example, the first and second cryptographic keys may be identical such that an electronic message is encrypted and decrypted with the same cryptographic key. The symmetric key algorithm, in one embodiment, may implement a stream cipher algorithm, a block cipher algorithm, or the like. In other embodiments, the symmetric key algorithm may include well-known symmetric algorithms such as AES, Blowfish, RC4, 3DES, and/or the like. One of skill in the art will recognize the various means to encrypt data. In one embodiment, the first and second cryptographic keys are private keys that may be distributed to few users, such as IT administrators, managers, and/or the like, without being widely distributed. In another embodiment, the first and second cryptographic keys represent a shared secret between the target device 202 and the administration device 208 in order to maintain the integrity of information being transferred.

In another embodiment, the cryptographic key algorithm may be an asymmetric key algorithm where the cryptographic key used to encrypt data is different than the cryptographic key used to decrypt the encrypted data. For example, one cryptographic key of a cryptographic key pair may be used to encrypt an electronic message, which may only be decrypted with the associated second cryptographic key of the cryptographic key pair. In another embodiment, the different cryptographic keys may be part of a public key infrastructure ("PKI") scheme that involves a public key and a private key pair where a message encrypted with the public key may only be decrypted with an associated private key.

For example, the second cryptographic key may be embodied as a public key that may be distributed to one or more users and used to encrypt an electronic message. The first cryptographic key may be embodied as a private key that is not distributed and is used to decrypt the electronic message encrypted with the second cryptographic key. In another example, during pre-boot authentication, the first cryptographic key may be the private key that is stored on a cryptographic processor 204. In one embodiment, the cryptographic processor 204 implements security features, such as encryption, limited accessibility, and/or the like, to maintain the secrecy of the first cryptographic key. A second cryptographic key may be the associated public key that is used to encrypt an electronic message, such as a digital certificate, which provides a user access to a target device 202. During pre-boot of the target device 202, the encrypted electronic message may be decrypted by the decryption module 315 using the first cryptographic key. In one embodiment, only the boot interface has access to the first cryptographic key during target device 202 pre-boot. In one embodiment, a user may be granted access to the target device 202 in response to the electronic message being decrypted with the private key.

In another embodiment, the apparatus 400 includes an administration module 410 that creates the electronic message. The administration module 410, in certain embodiments, may be located on the administration device 208. In one embodiment, the administration module 410 has access to the second cryptographic key and encrypts the electronic message with the second cryptographic key. In another embodiment, the administration module 410 provides an administrator access to the second cryptographic key in order for the administrator to electronically sign the electronic message to validate the information contained therein. For example, an administrator may create the electronic message setting the conditions regarding a user's access to the target device 202. In order for the target device 202 to determine the validity of the electronic message, an authorized administrator needs to digitally sign the electronic message, which the administration module 410 does by encrypting the electronic message with the second cryptographic key.

In one embodiment, the administration module 410 sets the scope of use for an authorized user in the electronic message. In certain embodiments, the scope of use may include the duration of the authorized use, one or more target devices 202 the user is authorized to operate, the permissions of the user on those devices, and/or the like. In one embodiment, an administrator determines the scope for the authorized user. For example, an administrator may allow an IT service professional access to three specific computers on a specific day and for a specific amount of time. Additionally, the administrator may specify the permissions of the user, such as whether the user has root level access, standard user access, guest user access, and/or the like. In another embodiment, the administration module 410 sets an expiration period for the electronic message such that the validity of the electronic message expires after a predetermined amount of time. For example, if a user attempts to use the electronic message to access a target device 202 after the expiration period has expired, the user will not be granted access to the target device 202 even though the electronic message may have been decrypted successfully.

In another embodiment, the apparatus 400 includes a distribution module 415 that distributes the encrypted electronic message to an authorized user without distributing the first and second cryptographic keys. In one embodiment, the distribution module 415 distributes the encrypted electronic message stored on a USB key, external hard disk drive, CD-ROM, and/or the like. One of skill in the art will recognize other computer readable storage media that may be mounted on the target device 202 during target device 202 pre-boot. In another embodiment, the encrypted electronic message may be distributed to the authorized user over the network 210. The authorized user, in other embodiments, may access a web service to access the available electronic messages and download the electronic messages to a mountable device. In one embodiment, the authorized user is required to securely sign on to the web service using credentials, such as a username and password.

In certain embodiments, the distribution module 415 allows an administrator to provide an authorized user access to a target device 202, such as a computer, without distributing the underlying security credentials, such as the first and second cryptographic keys. The first and second cryptographic keys, in one embodiment, are not disclosed to the authorized user, but are kept secret and only used to encrypt and decrypt the electronic message. In this manner, it is more difficult to compromise the system as the first and second cryptographic keys are not widely distributed or are only distributed to few authorized individuals, such as IT administrators, IT managers, and/or the like. In one embodiment the distribution module 415 is located on the administration device 208. In another embodiment, the distribution module 415 is located on another device accessible through the network 210.

Figure 5:
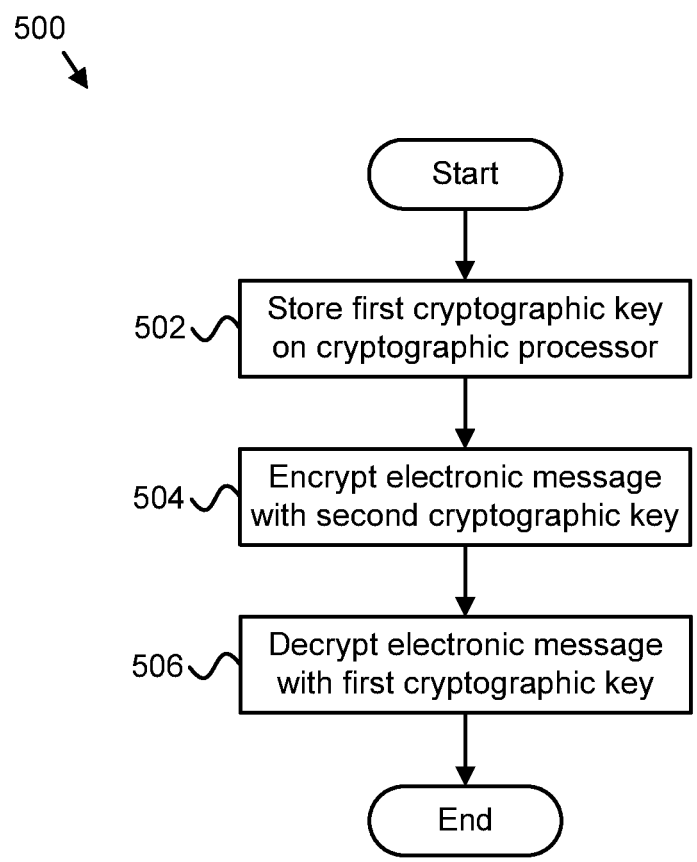
FIG. 5 is a schematic flow chart diagram illustrating one embodiment of a method for pre-boot authentication using a cryptographic processor in accordance with the present subject matter.

FIG. 5 is a schematic flow chart diagram illustrating one embodiment of a method 500 for pre-boot authentication using a cryptographic processor 204. The method 500 begins and stores 502 a first cryptographic key on a cryptographic processor 204. In one embodiment, a storage module 305 stores the first cryptographic key on the cryptographic processor 204. In another embodiment, the cryptographic processor 204 encrypts the first cryptographic key. In another embodiment, the first cryptographic key is stored on a portion of the cryptographic processor 204 dedicated to the boot interface during target device 202 pre-boot, such that only the boot interface has access to that portion of the cryptographic processor 204, including the first cryptographic key.

The method 500 encrypts 504 an electronic message with a second cryptographic key. In one embodiment, an encryption module 310 encrypts the electronic message with the second cryptographic key. The encryption module 310, in another embodiment, may be located on an administration device 208 that allows an administrator to create an electronic message and encrypt the electronic message with the second cryptographic key. In one embodiment, the second cryptographic key and the first cryptographic key comprise a cryptographic key pair such that an electronic message encrypted with the second cryptographic key may only be decrypted using the first cryptographic key.

The method 500 decrypts 506 the encrypted electronic message using the first cryptographic key. In one embodiment, a decryption module 315 decrypts the encrypted electronic message using the first cryptographic key. In another embodiment, the first cryptographic key stored on a portion of the cryptographic processor 204 dedicated to the boot interface is accessed by the boot interface during target device 202 pre-boot. An authorized user providing the encrypted electronic message during target device 202 pre-boot, in some embodiments, may be granted access to the target device 202 in response to the decryption module 315 successfully decrypting the encrypted electronic message and the method 500 ends.

Figure 6:
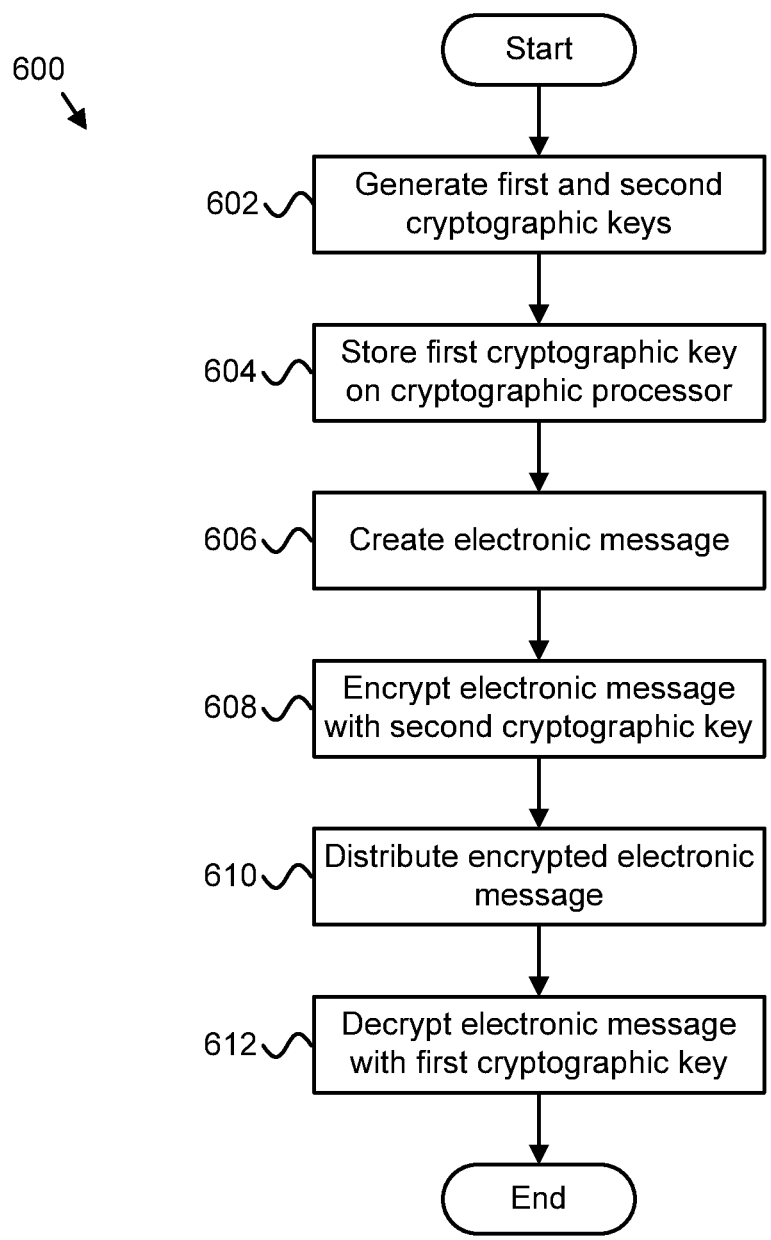
FIG. 6 is a schematic flow chart diagram illustrating another embodiment of a method for pre-boot authentication using a cryptographic processor in accordance with the present subject matter.

FIG. 6 is a schematic flow chart diagram illustrating another embodiment of a method 600 for pre-boot authentication using a cryptographic processor 204. In one embodiment, first and second cryptographic keys are generated 602, creating a cryptographic key pair. In certain embodiments, the first and second cryptographic keys are generated by a key generation module 405. In other embodiments, the first and second cryptographic keys are generated using either an asymmetric or symmetric cryptographic key algorithm. In a symmetric algorithm embodiment, the first and second cryptographic keys are identical such that the same key may encrypt and decrypt electronic messages. In an asymmetric algorithm embodiment, the first and second cryptographic keys are different. In one embodiment, the method 600 implements a PKI infrastructure using a symmetric key algorithm where the first cryptographic key is a private key and the second cryptographic key is a public key. In one embodiment, an electronic message may be encrypted with the public key and only decrypted with the private key. In certain embodiments, the method 600 stores 604 the first cryptographic key on a portion of a cryptographic processor 204 dedicated to the boot interface. In one embodiment, the boot interface may access the first cryptographic key during target device 202 pre-boot in order to decrypt a provided encrypted electronic message and validate access to the target device 202.

The method 600 creates 606 an electronic message. In one embodiment, an administration module 410 creates the electronic message and encrypts 608 the electronic message using a second cryptographic key. The electronic message, in certain embodiments, may contain data setting the scope of an authorized user's access to a target device 202, such as the duration of use, which devices may be accessed, user permissions, and/or the like. Moreover, an expiration date may be set on the electronic message such that the electronic message is no longer valid after a predetermined period of time.

The method 600 distributes 610 the encrypted electronic message to an authorized user without distributing the first and second cryptographic keys. In one embodiment, a distribution module 415 distributes the encrypted electronic message. The encrypted electronic message may be distributed using mountable hardware, such as a USB key, a CD-ROM, an external hard disk drive, and/or the like. Alternatively, the encrypted electronic message may be distributed to the authorized user through a web service over the network 210, after the authorized user validates his identity by providing credentials such as a username and password. The method 600 decrypts 612 the encrypted electronic message using the first cryptographic key. In one embodiment, the encrypted electronic message is presented to a target device 202 during target device 202 pre-boot. The boot interface, in some embodiments, accesses the first cryptographic key stored on the cryptographic processor 204 during target device 202 pre-boot to decrypt the encrypted electronic message. An authorized user may be granted access to the target device 202, in certain embodiments, upon successful decryption of the encrypted electronic message and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a memory storing machine readable code;
    a cryptographic processor configured to perform cryptographic operations, the cryptographic processor comprising at least a portion dedicated to a boot interface;
    a processor executing the machine readable code, the machine readable code comprising:
        a storage module storing a first cryptographic key on the portion of the cryptographic processor dedicated to the boot interface;
        an encryption module encrypting an electronic message with a second cryptographic key, the electronic message comprising data associated with a user's authorized use of a device wherein the encrypted electronic message is accessible through a web service, the encrypted electronic message being downloaded and stored on a mountable hardware device in response to the user providing a username and password to access the encrypted electronic message from the web service; and
        a decryption module decrypting the electronic message with the first cryptographic key in response to the electronic message being accessed from the mountable hardware device, the first cryptographic key being accessible to the boot interface during device pre-boot wherein the user is granted access to the device in response to the electronic message being decrypted.

2. The apparatus of claim 1, wherein the storage module provides the boot interface access to the first cryptographic key stored on the portion of the cryptographic processor dedicated to the boot interface during device pre-boot without providing access to other components of the device.

3. The apparatus of claim 1, further comprising a key generation module generating the first and second cryptographic keys using a cryptographic key algorithm, the cryptographic key algorithm comprising one or more of a symmetric key algorithm and an asymmetric key algorithm.

4. The apparatus of claim 3, wherein the first and second cryptographic keys are identical, the same cryptographic key being used for encrypting and decrypting the electronic message.

5. The apparatus of claim 3, wherein the first and second cryptographic keys are different, the first cryptographic key being used to decrypt the electronic message and the second cryptographic key being used to encrypt the electronic message.

6. The apparatus of claim 1, further comprising an administration module creating the electronic message, the administration module having access to the second cryptographic key and encrypting the electronic message with the second cryptographic key.

7. The apparatus of claim 6, wherein the administration module sets the scope of use for the user in the electronic message, the scope comprising one or more of duration of use, accessible devices, and access permissions.

8. The apparatus of claim 6, wherein the administration module sets an expiration period for the electronic message wherein the validity of the electronic message expires after a predetermined amount of time.

9. The apparatus of claim 1, further comprising a distribution module distributing the encrypted electronic message to the user without distributing the first and second cryptographic keys.

10. The apparatus of claim 1, wherein the cryptographic processor comprises a trusted platform module (TPM).

11. A method comprising:
    storing a first cryptographic key on a portion of a cryptographic processor dedicated to a boot interface of a device, the first cryptographic key being encrypted on the cryptographic processor;
    encrypting an electronic message with a second cryptographic key, the electronic message comprising data associated with a user's authorized use of the device wherein the encrypted electronic message is accessible through a web service, the encrypted electronic message being downloaded and stored on a mountable hardware device in response to the user providing a username and password to access the encrypted electronic message from the web service; and
    decrypting the electronic message with the first cryptographic key in response to the electronic message being accessed from the mountable hardware device, the first cryptographic key being decrypted and made accessible to the boot interface during device pre-boot wherein the user is granted access to the device in response to the electronic message being decrypted.

12. The method of claim 11, wherein the first cryptographic key stored on the portion of the cryptographic processor dedicated to the boot interface is accessible to the boot interface during device pre-boot without being accessible to other components of the device.

13. The method of claim 11, further comprising generating the first and second cryptographic keys using a cryptographic key algorithm, the cryptographic key algorithm comprising one or more of a symmetric key algorithm and an asymmetric key algorithm.

14. The method of claim 11, further comprising creating the electronic message, the electronic message being created by an administrator having access to the second cryptographic key, the administrator encrypting the electronic message with the second cryptographic key.

15. The method of claim 11, further comprising distributing the encrypted electronic message to the user without distributing the first and second cryptographic keys.

16. A program product comprising a non-transitory computer readable storage medium storing machine readable code executed by a processor to perform the operations of:
    storing a first cryptographic key on a portion of a cryptographic processor dedicated to a boot interface of a device;
    encrypting an electronic message with a second cryptographic key, the electronic message comprising data associated with a user's authorized use of the device wherein the encrypted electronic message is accessible through a web service, the encrypted electronic message being downloaded and stored on a mountable hardware device in response to the user providing a username and password to access the encrypted electronic message from the web service; and decrypting the electronic message with the first cryptographic key in response to the electronic message being accessed from the mountable hardware device, the first cryptographic key being accessible to the boot interface during device pre-boot wherein the user is granted access to the device in response to the electronic message being decrypted.

17. The program product of claim 16, wherein the first cryptographic key stored on the portion of the cryptographic processor dedicated to the boot interface is accessible to the boot interface during device pre-boot without being accessible to other components of the device.

18. The program product of claim 16, further comprising generating the first and second cryptographic keys using a cryptographic key algorithm, the cryptographic key algorithm comprising one or more of a symmetric key algorithm and an asymmetric key algorithm.

19. The program product of claim 16, further comprising creating the electronic message, the electronic message being created by an administrator having access to the second cryptographic key, the administrator encrypting the electronic message with the second cryptographic key.

20. The program product of claim 16, further comprising distributing the encrypted electronic message to the user without distributing the first and second cryptographic keys.

* * * * *